(12) United States Patent
Mokhtarzada et al.

(10) Patent No.: US 11,580,077 B2
(45) Date of Patent: Feb. 14, 2023

(54) METHOD AND SYSTEM FOR EXPANDING STORAGE CAPACITY USING CLOUD STORAGE SYSTEMS

(71) Applicant: MOKHTARZADA HOLDINGS, LLC, Silver Spring, MD (US)

(72) Inventors: Danyal Haroon Mokhtarzada, Silver Spring, MD (US); Zekeria Tariq Mokhtarzada, Silver Spring, MD (US); Ryan William Stout, Bozeman, MT (US)

(73) Assignee: MOKHTARZADA HOLDINGS, LLC, Silver Spring, MD (US)

( * ) Notice: Subject to any disclaimer, the term of this patent is extended or adjusted under 35 U.S.C. 154(b) by 0 days.

(21) Appl. No.: 17/336,403

(22) Filed: Jun. 2, 2021

(65) Prior Publication Data

US 2021/0286679 A1    Sep. 16, 2021

Related U.S. Application Data

(63) Continuation of application No. 16/245,244, filed on Jan. 10, 2019, now Pat. No. 11,042,445, which is a
(Continued)

(51) Int. Cl.
| | |
|---|---|
| *G06F 16/182* | (2019.01) |
| *G06F 16/10* | (2019.01) |
| *G06F 16/178* | (2019.01) |
| *G06F 16/11* | (2019.01) |
| *G06F 16/13* | (2019.01) |

(Continued)

(52) U.S. Cl.
CPC ...... *G06F 16/1824* (2019.01); *G06F 11/1451* (2013.01); *G06F 16/10* (2019.01); *G06F 16/113* (2019.01); *G06F 16/119* (2019.01); *G06F 16/122* (2019.01); *G06F 16/13* (2019.01); *G06F 16/178* (2019.01); *G06F 16/182* (2019.01); *G06F 16/1844* (2019.01); *G06F 16/2358* (2019.01)

(58) Field of Classification Search
CPC .................................................. G06F 16/1451
See application file for complete search history.

(56) References Cited

U.S. PATENT DOCUMENTS

| | | | | |
|---|---|---|---|---|
| 2007/0016618 | A1* | 1/2007 | Robert | ............... G06F 16/1737 |
| 2017/0286442 | A1* | 10/2017 | Xie | ..................... G06F 16/1727 |

\* cited by examiner

*Primary Examiner* — Van H Oberly
(74) *Attorney, Agent, or Firm* — Pillsbury Winthrop Shaw Pittman LLP

(57) ABSTRACT

In some embodiments, a computer system may buffer, in a local storage buffer, data to be stored at the cloud and upload the data to the cloud storage from the local storage buffer. Upon receipt of an acknowledgement, from the cloud storage, that the data was successfully uploaded, the computer system may delete the data from the local storage buffer. The computer system may provide a ghost file representation of the uploaded data through the computer system, through which the data uploaded to the cloud storage may be accessed. In some embodiments, the computer system may access multiple cloud storage accounts, each corresponding to a file folder on the computer system, allowing the user to easily access different cloud storage accounts. The computer system may recover data that was deleted from either local persistent storage or the cloud storage.

4 Claims, 14 Drawing Sheets

Related U.S. Application Data continuation of application No. 15/497,102, filed on Apr. 25, 2017, now Pat. No. 10,180,883, which is a continuation of application No. 14/832,771, filed on Aug. 21, 2015, now Pat. No. 9,646,010.

(60) Provisional application No. 62/042,679, filed on Aug. 27, 2014.

(51) Int. Cl.
*G06F 11/14* (2006.01)
*G06F 16/23* (2019.01)

METHOD AND SYSTEM FOR EXPANDING STORAGE CAPACITY USING CLOUD STORAGE SYSTEMS

CROSS REFERENCE TO RELATED APPLICATIONS

This application is a continuation of U.S. patent application Ser. No. 16/245,244, filed on Jan. 10, 2019, which is a continuation of U.S. patent application Ser. No. 15/497,102, filed Aug. 25, 2017, now U.S. Pat. No. 10,180,883, issued on Jan. 15, 2019, which is a continuation of U.S. patent application Ser. No. 14/832,771, filed Aug. 21, 2015, now U.S. Pat. No. 9,646,010, issued on May 9, 2017, which claims priority to U.S. Provisional Patent Application No. 62/042,679, filed Aug. 27, 2014, the contents of which are hereby incorporated herein by reference in its entirety.

FIELD OF THE INVENTION

The invention relates to a method and system of expanding the apparent storage capacity of a local storage drive by storing data at and retrieving data from cloud storage through the local storage drive.

BACKGROUND

In recent years, the demand for data storage has rapidly increased. Traditionally, in order to store a large amount of data, users employ various devices and methods, such as additional storage devices and upgrades to existing hardware. Efficient use of data storage capacity is facilitated by managing free space on storage devices, purging data that is no longer needed, and so on.

Cloud storage has become more popular in recent years. The "cloud" is a metaphorical term that refers to a distributed environment for data processing and storage over a network of connected processing and storage resources. Cloud technology provides a user with convenient access to all such resources on the cloud. For example, many cloud storage solutions require only minimal management for the user. Cloud storage provides users with immediate access to a broad range of resources and applications that are hosted in the infrastructure of remote network resources, via a web service interface. Cloud systems may also be advantageous because they often have redundancy and durability built in. As such, data storage may be more reliable in a redundant cloud storage system than in other non-cloud systems.

By storing files on the cloud storage system, the user can remotely access and download files. For example, a user can transfer a file from a desktop computer to the cloud-based storage, and then later the user can access that file from a different computing device.

Any given stand-alone computer or data processing system will have a finite (albeit large) data storage capacity. By contrast, the sum total of all of the storage resources potentially available on the cloud may be regarded as unlimited. However, due to limitations in the throughput and transfer speed between the user's local system and the cloud, users have found it to be cumbersome to store data in cloud storage systems. For example, when a large amount of data is to be stored in the cloud, the user's computer must remain on, and must remain connected to a communication network, (such as the internet) for the duration of the data transfer. In addition, large transfers over existing means such as through a web browser often fail and require the user to make multiple attempts at uploading.

Managing the data stored on the cloud can be cumbersome. For example, when a user performs operations such as move, rename, and add folders, and so on, with the original files that are directly uploaded in the cloud, the cloud storage resources may employ application processes and procedures that are different from those to which the user is accustomed on the local system. The process of moving files may additionally be cumbersome, if it is done via a cloud application rather than using local file system operations.

In light of the aforementioned reasons, it appears that there is a need to introduce a method and system which allows a device to automatically upload to a cloud account and also facilitate automatic removal of the uploaded files from the device, so that the device's storage capacity is not limited or reduced by the current or past presence of the uploaded data. These and other drawbacks associated with conventional systems of storing data at a local storage device or through the cloud exist.

SUMMARY

The invention addressing these and other drawbacks relates to a method or system of expanding the storage capacity of a local storage drive by storing data at and retrieving data from cloud storage through the local storage drive (also referred to herein as "drive"), according to an implementation of the invention. The drive may be configured as a standalone storage device, which may be coupled (via a wired or wireless connection) to a user electronic device such as a computer. The drive may have network communication capability that allows the drive to upload data to and download data from cloud storage, which may be offered by various cloud storage providers.

The drive may include a physical memory, which may include a local storage buffer. When data is transferred to the drive for storage (e.g., from the user electronic device), the data may be stored in the local storage buffer and uploaded to cloud storage. In an implementation, upon receipt of an acknowledgement from cloud storage that the data has been successfully uploaded, the drive may delete the data from the local storage buffer. Thus, storage capacity of the local storage buffer (and therefore the drive itself) may be allocated for other data to be transferred from the user electronic device (or other data source). These and other operations (described herein) may be programmed as default measures of the drive (e.g., set by a manufacturer of the drive, a user of the device, etc.).

The drive may generate ghost files (or otherwise store such ghost files on the drive) that represent the transferred data so that the data is accessible to the user from the drive as if the data is stored at the drive. A given ghost file may be represented as an icon, a thumbnail, or other visual indication of the transferred data. The device may store a given ghost file in a location that corresponds to the transferred data. For instance, a user may drag a file from the user electronic device to a folder on the drive. In other examples, the user may use a "save as" function from the user electronic device to the folder on the drive. Other ways of receiving data to be stored through the drive may be used as well. The drive may store the file in the local storage buffer, upload the file to cloud storage, remove the file from the drive upon acknowledgement that the file was successfully uploaded, and place a ghost file in the folder (e.g., a ghost file generated by the drive, a ghost file generated in the cloud and provided to the drive for storage in the folder, etc.). The user may obtain the file through the ghost file by double-clicking, dragging, or otherwise selecting the ghost file.

Upon selection of the ghost file, the drive associates the ghost file with the actual file stored at cloud storage, retrieves the file from cloud storage, and provides the contents of the file through the drive. In this manner, files stored using cloud storage may appear to the user to be stored at the drive.

In an implementation, the physical memory may be used to persistently store data. For instance, the drive may include a second area (e.g., a second folder) that corresponds to files persistently stored at the drive (which may also be stored at cloud storage). In this manner, the drive may be used as a conventional storage device as well, but having at least a first area (e.g., a first folder) designated for cloud storage and at least a second area (e.g., a second folder) designated for local persistent storage. Upon creating a folder, for instance, the drive may associate the folder with cloud storage, local persistent storage, or both. In some instances the drive may make such association based on user input (e.g., the user may specify whether different folders should correspond to cloud storage, local persistent storage, or both).

In an implementation, different folders may correspond to different storage areas. For instance, a working files folder, an archive folder, a local only folder, and/or other types of folders. The working files folder may correspond to files persistently stored locally at the drive. The files in the working files folder may also be copied to the cloud such that files in the working folder are backed up on the cloud. The archive folder may correspond to files whose originals are stored only on the cloud using a cloud storage account and where only ghost files exist locally. The local only folder may correspond to files stored only locally (and not backed up on the cloud). A given file may be moved between the different folders, causing the given file to be stored at different locations, depending on where the file has been moved to/from. For instance, a file in the working files folder that is moved (e.g., via a drag and drop or other interaction) to the archive folder may cause the file to be removed from the local storage drive (since the file is already stored on the cloud, the effect of this action effectively makes the file stored only on the cloud, freeing up local storage capacity). In this instance, the drive may create (or otherwise store) a ghost file representation of the file in the archive folder. Likewise, moving a ghost file from the archive folder to the working files folder may cause the corresponding original file to be downloaded from the cloud to the working files folder. Moving a ghost file from the archive folder to the local only folder may cause the file to be deleted from the cloud and added to the local only folder (as well as creating a file icon for the actual file). Moving a ghost file from working files folder to the local only folder may cause the file to be deleted from the cloud. Other types of file movements between other types of folders may cause similar file movements and creation of file representations (whether file icons, ghost files, or other representations) as well.

In an implementation, the drive may access more than one cloud storage accounts provided by the same or different cloud storage providers. For instance, the drive may create (e.g., at the direction of the user, such as during a registration process) different folders corresponding to different cloud storage accounts. In particular, the drive may create a first folder that corresponds to a first cloud storage service and a second folder that corresponds to a second cloud storage service. In this manner, depending on the folder to which a file is dragged, drive may cause the file to be stored locally, at a first cloud storage, at a second cloud storage, and/or other location, allowing the user easy control over where a given file is to be stored.

In an implementation, the drive may provide file deletion recovery capability. For instance, upon user deletion of an actual file stored locally or a ghost file corresponding to cloud storage from the drive, the drive may cause the actual file or ghost file to be moved to an area such as a folder corresponding to deleted data. Such area/folder may be visible or invisible to the user. The drive may associate the deleted file or ghost file with a deletion time and keep the file in the deleted area until a predetermined time has expired (e.g., 30 days). Upon expiration of the predetermined time, the drive may actually delete the file or cause the file to be removed from cloud storage. If the user requests deletion recovery before expiration of the predetermined time, then the drive may restore the file or ghost file to its original location, or to a separate recovery folder where the user can then move it to an appropriate location.

The drive may manage deletion recovery in other ways as well. For instance, immediately upon receiving a request to delete a file or ghost file, drive may copy the file (whether stored locally or at cloud storage) to a recovery area and remove the file or ghost file (as well as cause cloud storage to remove the file, if applicable). The file may remain in the recovery area (and may be recoverable) until expiration of the predetermined time, after which the file is deleted from the deleted area. The recovery area may be part of a partition of the drive, cloud storage, and/or storage provided by the system.

In an implementation, the drive may be programmed with instructions (e.g., firmware), which may be embedded in the drive. This may allow for operation without downloading separate applications or instructions to operate. In this manner, the drive may be "plug-n-play" ready, leveraging the interfaces of an attached user electronic device. For instance, drag-and-drop capability of the user electronic device may be used to transfer files between the device and cloud storage, between the cloud storage and data sources, and/or between the device and other data sources. In other instances, the device may leverage the use of differentially representing files (e.g., coloring file icons separately) based on its transfer progress. An example includes use of OS X labels, from APPLE INC. For instance, a file being transferred may have its file label colored yellow, a file whose transfer is complete may have its file label colored green, a file whose transfer is complete and has been ghosted may have its file label colored blue, and a file whose transfer failed may have its file label changed to red. Other colors and representations may be used as well. In an implementation, the drive may be self-contained for use without an attached user electronic device. For instance, the drive may include an output device that indicates a status of an upload and/or an input device used to control file transfers. The output device may include a display, an indicator light, a speaker, and/or or other device that can provide an output related to the functions described herein. The input device may include a soft or hard button, a rocker switch, a touch screen, and/or other device that can receive an input related to the functions described herein. For instance, a user may use an input device to indicate that files from a storage source be transferred to the cloud or other storage location associated with the drive. The output device may indicate, the transfer status via the output device. In these instances, the storage drive may include a storage input device (e.g., a USB, FIREWIRE, BLUETOOTH receiver/transmitter, etc.) that can receive an input from an external data source (e.g., a USB memory stick) and upload contents of the external data source to the cloud storage without a connected user electronic device (e.g., a user's computer).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

In the accompanying figures, similar reference numerals may refer to identical or functionally similar elements. These reference numerals are used in the detailed description to illustrate various implementations and to explain various aspects and advantages of the present disclosure.

DETAILED DESCRIPTION

The above-mentioned needs are met by a method and system for utilizing a storage drive as a temporary repository for data, while preserving for the user the perception of an unlimited storage capacity across a cloud storage environment, and while employing the user's familiar application processes and procedures for data storage and retrieval.

System Architecture

In accordance with an embodiment of the present subject matter, interfacing hardware is provided as a separate, stand-alone local storage device such as a hard drive. This interfacing hardware is coupled between the user's local computer system and the network. The interfacing hardware is used to temporarily store the data before transferring through the network, to or from the cloud.

Figure 1:
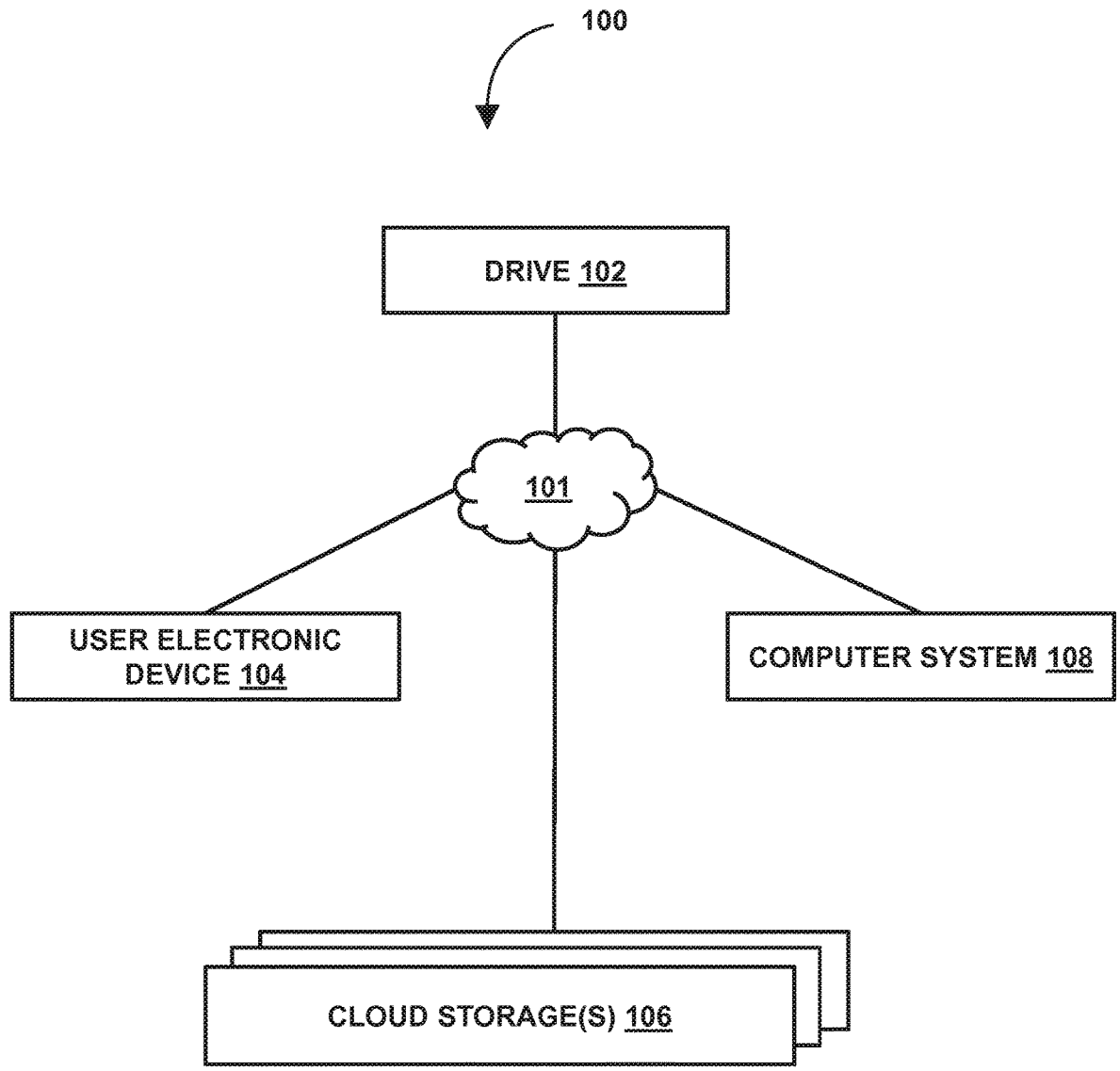
FIG. 1 illustrates a system for expanding the storage capacity of a local storage drive using cloud storage, according to an implementation of the invention.

FIG. 1 illustrates a system 100 for expanding the storage capacity of a local storage drive using cloud storage, according to an implementation of the invention. System 100 may include a local storage drive 102 (also referred to interchangeably herein as "drive 102"), a user electronic device 104, cloud storage 106, a computer system 108, and/or other components. The components illustrated in system 100 may be connected to one another via a network 101.

In an implementation, drive 102 may be directly coupled to user electronic device 104 other than through network 101. For instance, drive 102 may be directly connected to user electronic device 104 through a local wireless or wired connection. Such local wireless or wired connection may include, without limitation, a USB connection, an Ethernet connection, a THUNDERBOLT connection, a FIREWIRE connection, a Wi-Fi connection, a BLUETOOTH connection, and/or other type of local connection.

Drive 102 may be configured as an external storage device such as an external hard drive. In the discussion which follows, certain functionality will be attributed to drive 102. While there may be implementations in which drive 102 is implemented as an intelligent device having its own on-board computer processor, software program code, etc., for implementing such functionality, the present specification shall not be understood to be limited to such implementations. Rather, the functionality, processor and software, etc., implementing such functionality may instead reside on-board the user electronic device 104, or on another piece of associated computer equipment (not shown separately in FIG. 1) which supports the functionality here described. Therefore, it will be understood that the attribution of such functionality to the drive 102 itself, is a non-limiting convention, merely presented for convenient understanding of the implementations here contemplated.

Drive 102 enables the user to move data from the user electronic device 104 to the cloud storage 106. For example, a user uses the user interface functions supported by the operating system of the user electronic device 104, to store the files at cloud storage 106. This, for instance, may simply involve dragging and dropping an icon for a data object onto a window, icon, etc., representing drive 102.

Upon receiving such data from the user electronic device 104, drive 102 stores the data locally. Then, drive 102 automatically uploads the stored data into the cloud storage 106. Unlike the conventional systems, no additional user interaction is required for managing the data while storing in the cloud storage 106. Since the cloud storage 106 has for practical purposes infinite storage capacity, the user perceives that infinite storage capacity even though drive 102 itself has only a finite storage capacity. The storage capacity of drive 102 that is available to the user is not reduced or limited, because the automatic upload to the cloud also includes automatic cleanup of the drive 102, so that the storage capacity of the drive 102 that temporarily was taken up by the data again becomes available. These and other operations (described herein) may be programmed as default measures of the drive (e.g., set by a manufacturer of the drive, a user of the device, etc.), for example, to automatically upload the stored data, automatically cleanup the drive 102, or to facilitate other automatic operations.

In an embodiment, drive 102 can create ghost versions of the user's files (used interchangeably herein with "ghost files") along with the original folder structure. A ghost file is a representation of an original file that has been transferred to cloud storage and is no longer locally stored. In some instances, a ghost file may be represented in a manner similar to an actual file stored locally and may therefore be indistinguishable (from a user perspective) from an actual file. Thus, a ghost file may give the user the perception that the data, which is actually in the cloud, appears to be stored at drive 102. For example, the ghost versions can include, but not limited to, negligibly small files with the same file name, small jpg files (such as low resolution pictures or thumbnails), html files, and/or other type of representation. Hence, the users can have access to high level information of the data, such as the filename, filetype, or abstract of its content, by using the ghost files. Thus, unlike the conventional systems, the users can keep track of original files and manage them (moving or renaming or adding folders, and so on) by manipulating the ghost files on drive 102. In some instances, a ghost file can be distinguished from an actual file. In some of these instances, for example, a ghost file may be visually depicted differently than an actual file. Such visual depiction may include shadowing, use of transparency (e.g., a ghost file may be visually depicted as semi-transparent), use of a visual marker (e.g., an asterisk, an icon indicating a file is a ghost file) displayed in association with a ghost file, and/or other visual depiction that distinguishes a ghost file representation (which is associated with a file stored at cloud storage) from a non-ghost file representation (e.g., an actual file representation that is associated with a file stored locally).

After the user moves the data from the user electronic device 104 to drive 102, the data is transferred to the cloud for more permanent storage. Upon successful upload to cloud storage 106, drive 102 may generate ghost files representative of the transferred data, and delete the data from drive 102. The ghost files permit the user to visualize the files that have been stored in the cloud, represented in the familiar file system as it is supported by the operating system of the user electronic device 104. The user may then manage/organize those files also in that same interface (rename, move to folders, etc.)

In an embodiment, the data can be moved in batches or suitable modular quantities, herein referred to without limitation as "chunks" or "data items," and that the chunks may vary in size, but not exceed the capacity of drive 102. Since today's data storage drives have large capacities at low costs per unit of data, the size of the chunks can be moved is not likely to be an undesirable limiting factor for the user. In an embodiment, the chunk can be partitioned and stored separately in the cloud storage 106.

Drive 102 automatically, and in an embodiment continuously, verifies whether the data is successfully stored in the cloud storage 106. When a chunk is transferred from drive 102 to the cloud storage 106, and the cloud acknowledges receipt of the chunk, the drive clean-up involves deleting the entire chunk from the drive, keeping only the ghost file.

As long as the clean-up process and the data transfer throughput rate keep up with the user's employment of user interface activities to move data chunks, there is always freed-up drive space for the next chunk of data to be transferred. As a result, drive 102 always maintains sufficient space for additional data to transfer to cloud storage 106. Thus, the finite capacity of drive 102 is transparent to the user, and the data transfer throughput rate does not serve as a data transfer bottleneck, nor does it detract from the user's perception that essentially infinite storage space is available for use.

The user electronic device 104 can be, but not limited to, personal computers (such as a laptop computer, desktop computer), personal digital assistant (PDA), and mobile devices (such as cell phones, and smart phones). When a store request is received from a user, the system 100 allows the user electronic device 104 to transfer the data to be stored to drive 102.

The cloud storage 106 can be any network cloud that provides network connectivity. For example, the cloud storage 106 can be local area network, wide area network, intranet, or the Internet. The cloud storage 106 connectivity may be wired or wireless including radio frequency (RF), infrared, or electromagnetic connectivity. The cloud storage 106 further includes data storage capacity. In an embodiment, the cloud storage 106 is a remote storage system provided by the cloud storage network provider for remotely storing the user's data. For example, the cloud storage network provider can be a third party service provider or a site that belongs to the enterprise that uses the system 100. Typically, the cloud storage 106 provides virtually unlimited storage capacity to the users. The cloud storage 106 may include one or more servers and extremely large storage subsystems, for example, Redundant Array of Independent Disks (RAIDs).

Network 101 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Cloud storage 106 may include one or more networked storage solutions (e.g., AMAZON S3, GOOGLE DRIVE, MICROSOFT AZURE, etc.) offered by various cloud storage services (e.g. vendors such as AMAZON, GOOGLE, MICROSOFT, etc.). In some implementations, cloud storage 106 may include one or more online/social storage systems such as, without limitation (PICASSA, INSTAGRAM, FACEBOOK, etc.). Thus, cloud storage 106 may include one or more networked storage solutions to which data can be uploaded or from which data may be downloaded (typically using account credentials).

Functionality of Drive 102

Figure 2A:
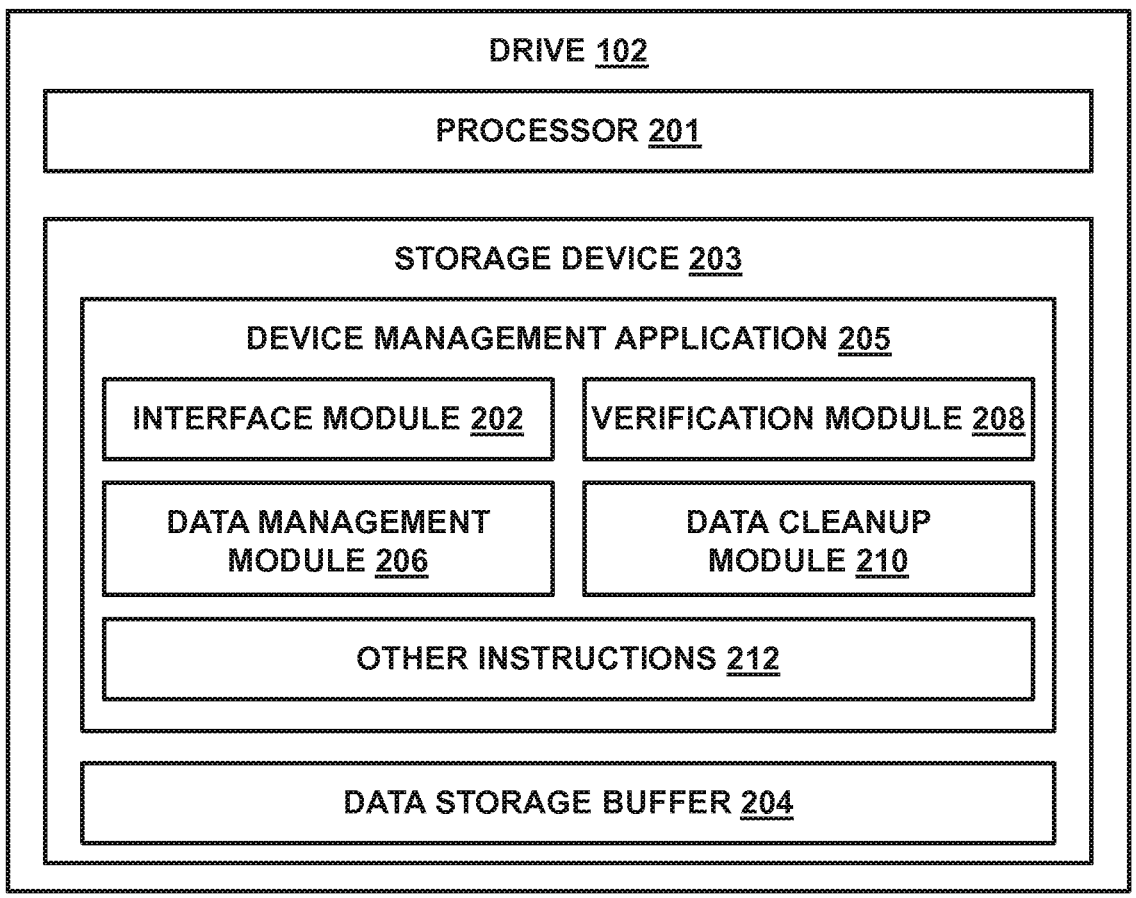
FIG. 2A illustrates a local storage drive that stores data at and retrieves data from cloud storage, according to an implementation of the invention.

FIG. 2A illustrates a local storage drive 102 that stores data at and retrieves data from cloud storage, according to an implementation of the invention. Drive 102 may include one or more processor(s) 201, a storage device 203, and/or other components. Storage device 203 may include a temporary data storage buffer 207, a persistent storage 209, and/or other storage partition/area. Temporary data storage buffer 207 may be used to temporarily store data while such data awaits transfer to cloud storage 106. Persistent storage 209 may be configured to store data locally at drive 102 in addition to or instead of at cloud storage 106.

Processors 201 may be programmed by one or more computer program instructions. For example, processors 201 may be programmed by device management application 205 (which may be stored at storage device 203) and/or other instructions. Device management application 205 may itself include various instructions that program drive 102. The instructions may include, without limitation, an interface module 202, a data management module 206, a verification module 208, a data cleanup module 210, and/or other instructions 212 that program drive 102 to perform various operations, each of which are described in greater detail herein. As used herein, for convenience, the various instructions will be described as performing an operation, when, in fact, the various instructions program the processors 201 (and therefore drive 102) to perform the operation.

Drive 102, as a stand-alone device, may have sufficient on-board computing capability to perform the functions described herein without the use of any external processor. Alternatively, a processor on another device, such as user electronic device 104 or computer system 108, may perform one or more of the functions described with respect to device management application 205.

As described herein, computer software products can be written in any of various suitable programming languages. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired electronic network, telephone network, packet network, an optical network, or a wireless network, or a combination of such networks. For example, data and other information can be passed between the computer and components (or operations) of a system using a wireless network based on a protocol, for example Wi-Fi (IEEE standards 802.11, 802.11a, 802.11b, 802.11e, 802.11g, 802.11i, and 1802.11n). In one example, signals from the computer can be transferred, at least in part, wirelessly to components or other computers.

It is to be understood that although various components are illustrated herein as separate entities, each illustrated component represents a collection of functionalities that can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Exemplary Architecture of Drive 102

Referring again to the block diagram in FIG. 2A, the interface module 202 generally governs and manages the input and output of drive 102. The interface module 202 facilitates communication between drive 102 and the user electronic device 104. The interface may include any interconnect or bus such as Ethernet, Peripheral Component Interconnect (PCI), PCI Express, Universal Serial Bus (USB), Small Computer System Interface (SCSI), serial SCSI, iSCSI, Fibre Channel, and Direct Media Interface (DMI), and so on.

The interface module 202 also provides interface to the cloud storage devices (for example, the cloud storage 106) to store archive information such as code, programs, files, data, and applications. For example, the interface may include Ethernet, SCSI, serial SCSI, iSCSI, Fibre Channel, Advanced Technology Attachment (ATA) (parallel and/or serial), Integrated Drive Electronics (IDE), enhanced IDE, ATA Packet Interface (ATAPI), and so on. The interface module 202 can be configured to receive data from the user electronic device 104, and to pass the data to the data storage buffer 204 in drive 102.

The data storage buffer 204 may be a partitioned subset of the drive data storage available on drive 102. It receives the data chunk from the user electronic device 104 through the interface module 202. The data storage buffer 204 stores the data chunk temporarily before the data chunk is transferred to the cloud storage 106. The data storage buffer 204 also stores the ghost files of the data along with original folder structure.

The data management module 206 synchronizes local operations to the cloud database and automatically uploads new data chunks to the cloud storage 106 from the data storage buffer 204 of drive 102, in accordance with a suitable data transfer and storage protocol of the cloud storage 106. The data management module 206 can be configured to update a remote record of the transferred data, so the data or the files stored in the cloud storage 106 can be seen or recovered without having access to drive 102, for example, through a web interface to another user electronic device.

In an implementation, data management module 206 may maintain different storage areas of storage device 203. For instance, data management module 206 may store a Working Folder (or other storage area) at persistent storage 209 that persistently stores data at drive 102, an Archive Folder (or other storage area) that stores ghost files, a deleted folder that stores data that has been deleted (but may be recovered, as described herein), and/or other storage areas.

The verification module 208 continuously verifies whether the data is successfully transferred in the cloud storage 106 and stored therein. Further, the verification module 208 can be configured to receive an acknowledgement from the cloud in response to successful transfer of the user's data in the cloud storage 106. Once the verification acknowledgement is received from the cloud storage 106, the data cleanup module 210 removes the substantial portion of data from the data storage buffer 204 in order to make space for additional data to be copied.

Functionality of the Computer System

Figure 2B:
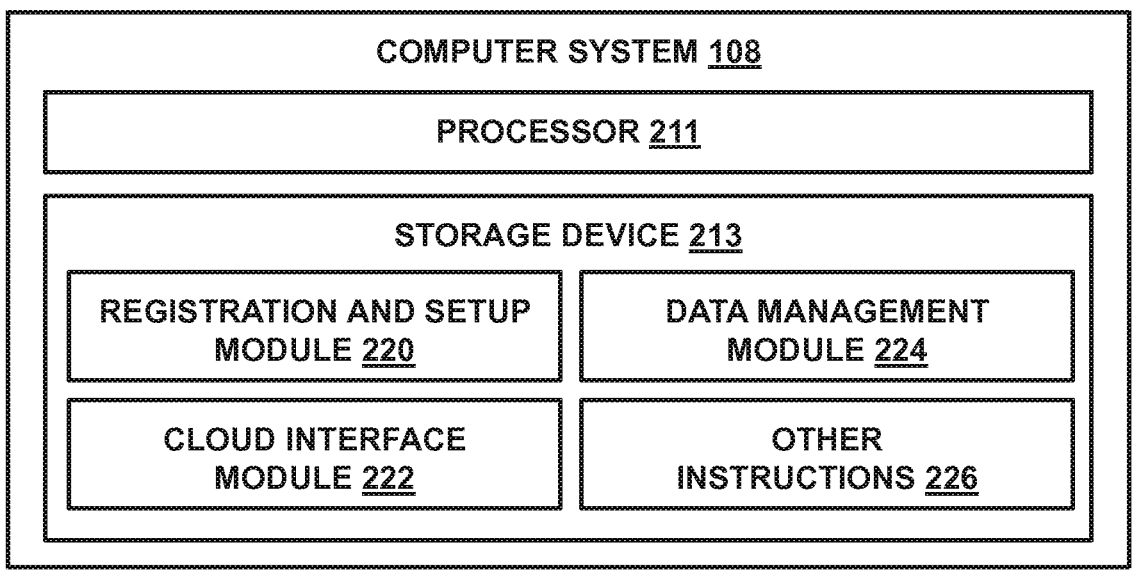
FIG. 2B illustrates a computer system that facilitates expansion of the storage capacity of a local storage drive using cloud storage, according to an implementation of the invention.

FIG. 2B illustrates a computer system 108 that facilitates expansion of the storage capacity of a local storage drive using cloud storage, according to an implementation of the invention. Computer system 108 may include one or more processor(s) 211, a storage device 213, and/or other components.

Processors 211 may be programmed by one or more computer program instructions. For example, processors 211 may be programmed by one or more instructions (which may be stored at storage device 213) and/or other instructions. The instructions may include, without limitation, a registration module 220, a cloud interface module 222, a data management module 224, and/or other instructions 226 that program computer system 108 to perform various operations, each of which are described in greater detail herein. As used herein, for convenience, the various instructions will be described as performing an operation, when, in fact, the various instructions program the processors 211 (and therefore computer system 108) to perform the operation.

In an implementation, registration module 220 may obtain registration information related to use of drive 102. The registration information may be obtained via a website, mobile application, or other interface through which a user may provide such information to registration module 220. The registration information may be stored at computer system 108, at drive 102, and/or other location.

The registration information may include, without limitation, a device identifier that identifies drive 102, a user identifier that identifies a user of drive 102, account credential information used to access an account at cloud storage 106, and/or other information. The account credential information may include an identity of a cloud service provider, an account identifier, authentication information (e.g., a password or other secret), and/or other information used to logon to a pre-existing account associated with a user to store information at cloud storage 106.

In some instances, registration module 220 may facilitate setting up an account at cloud storage 106 if the user has not already signed up for such an account. In some instances, drive 102 may be pre-programmed with a trial account at cloud storage 106. In this manner, a user may sign up for a trial account to use with drive 102.

In instances where multiple cloud storage services may be used, registration module 220 may obtain and store account credential information for each such service. Additionally, registration module 220 may setup various storage areas (e.g., folders) that each correspond to a given storage service. For instance, using information obtained by registration module 220, drive 102 may generate a first set of one or more folders that correspond to a first cloud storage 106, a second set of one or more folders that correspond to a second cloud storage 106, and so on. In this manner, a user may configure drive 102 to store data using different cloud storage services and may cause data to be stored at the different cloud storage services by dragging files to their appropriate folders.

In an implementation, cloud interface module 222 may access cloud storage 106 based on the account credential information. Cloud interface module 222 may access different cloud storage services using respective interfaces exposed by such services. In some instances, cloud interface module 222 may itself use an interface that interacts with interfaces exposed by cloud storage services. In this manner, the system may be cloud storage agnostic and use any available cloud storage service.

In an implementation, data management module 224 may facilitate the transfer of data between drive 102 and cloud storage 106. For instance, in some instances, data management module 224 may receive data from drive 102 and transfer the data to cloud storage 106. In some instances, data management module 224 may receive, from drive 102, a request to obtain data from cloud storage 106 and cause the data to be transferred from cloud storage 106 to drive 102. In other instances, such transfer may occur directly between drive 102 and cloud storage 106 without intervention by computer system 108. It should be noted that the various functions described herein with respect to computer system 108 may be provided by drive 102. For instance, drive 102 may obtain and store registration information using one or more interfaces of an electronic user device 104, as well as set up various folders described herein.

Process for Storing Data on the Cloud

Figure 3:
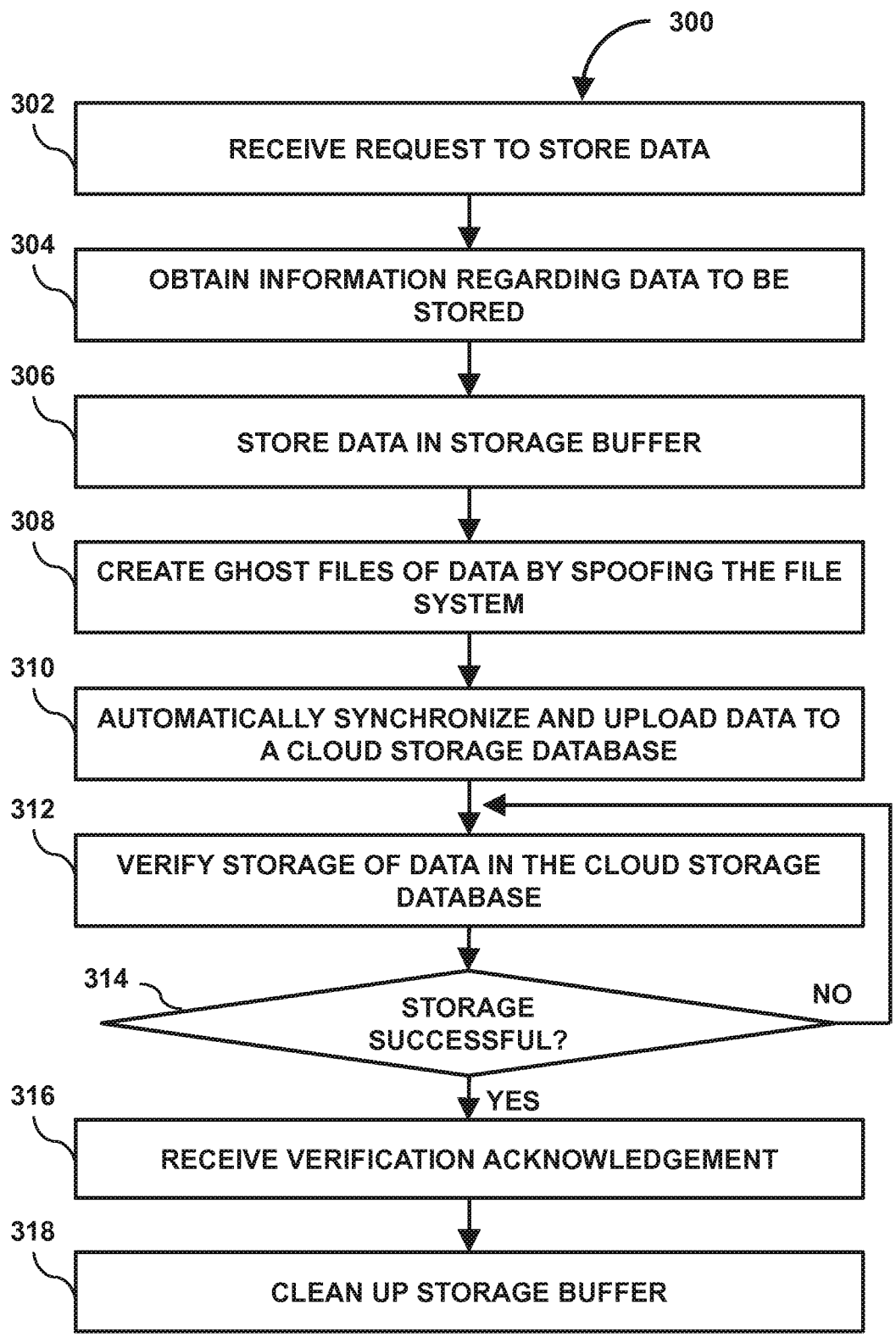
FIG. 3 illustrates a process flow diagram for expanding the storage capacity of a local storage drive using cloud storage, according to an implementation of the invention.

FIG. 3 illustrates a process flow diagram 300 for expanding the storage capacity of a local storage drive using cloud storage, according to an implementation of the invention. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Initially, system 100 may receive a request from the user device (i.e., user electronic device 104) to store a data item in the cloud storage 106. In an operation 302, a store request is received from the user through the user electronic device 104. The user can send the store request by using a suitable user interface provided through the user interface of the user electronic device 104.

In response to receiving the store request, at operation 304, information is obtained regarding the data to be stored in the cloud storage 106. Drive 102 automatically moves the data chunks received from the user electronic device 104 to the cloud storage 106 through the network interface.

The user electronic device 104 serves as a dedicated device. Thus the user electronic device 104 can monitor bandwidth usage, and can optimize its upload/download based on what the user is doing. For example, the device 104 could use substantially more bandwidth for data transfer during offpeak times, but leave plenty of available bandwidth when the user is actively using the internet connection for other activities.

In an embodiment, the cloud storage system 100 can obtain user account details in order to store the data in a personalized cloud database.

In an operation 306, data chunks are temporarily stored in the storage buffer 204 of drive 102. In an operation 308, ghost files are created, of the data chunks obtained from the user. A ghost file may be defined as a data object which resides, or appears to the user to reside, on drive 102, and which is identified by name, thumbnail image, or other indicia so as to indicate to the user that the ghost file represents the data file which the user moved to drive 102 to store in the cloud. The ghost file serves as a virtual representation of the data which the user moved to the cloud, and may be accessed or manipulated by the user in representation of the cloud-stored data file itself.

The method 300 of FIG. 3 allows the data management module 206 to create the ghost files. For example, shortcut, thumbnail, or other files may be generated to represent the files that are automatically uploaded and removed from drive 102. As another example, the file system in drive 102 is spoofed, so that after the files are automatically uploaded and removed from drive 102, ghost versions on drive 102 are left, as well as the original folder structure. (The term "spoof" is here used, in the sense the term is used in information technology, to mean faking or simulating the files. That is, the file system in the driver 102 is spoofed due to the presence of the ghost files.) Hence, the users can see all the files that are backed up, in ghost representation, even after the files are uploaded and deleted from drive 102. These ghost files can also be in the form of small jpg, gif, png or html files that can show low-res versions of photos or a page with additional meta-data about the file. Moreover, the original files can be manipulated, in essentially conventional fashion, by moving, renaming, adding folders, and so on with these ghost files. In an embodiment, the ghosting of files after an upload allows the users to see all of their backed up files in the cloud in a familiar user interface, and allows them to manage/organize the files in that same interface. For example, re-organizing can include renaming files, and moving files to folders.

For example, suppose the data to be stored in the cloud storage 106 is a document. The ghost files may include metadata information relating to the transferred data such as, but not limited to, the title, the author, the word count, the ownership, the revision history, the encryption, and so on of the document. The ghost files may also include a data structure that represents the organization of the data or the various files contained in the data. In an embodiment, user may perform high-level tasks such as browsing through a database, a file system, a document structure, and so on by using the ghost files. For example, users can see all the files they have backed up even after the files are automatically uploaded to the cloud.

In an operation 310, the data chunks are automatically synchronized and uploaded to the cloud storage 106 for permanent storage. In an embodiment, drive 102 can be configured to share a folder that users can see via the user interface of the electronic user device 104. When a file is copied, the operating system on drive 102 notifies a listening application (herein also referred to as a drive monitor; not shown individually in FIG. 2) running on drive 102.

The drive monitor keeps an internal record of the synchronization state of every file and directory, and marks those that need to be synced. Furthermore, in the event that the file was not actually changed, drive 102 will not mark the file as needing to be synced. If a file is deleted, it will be marked as needing to be synced, and as having been deleted. The drive monitor will take files needing to be synced, and operate automatically so as to upload them to the cloud storage 106. Drive 102 will also update a remote record of the data, so that the data or the files stored in the cloud storage 106 can be seen or recovered without having access to drive 102, for example, through a web interface.

In an embodiment, drive 102 provides various input slots like a Universal Serial Bus (USB), Firewire, Thunderbolt, and Secure Digital slots, Ethernet, and so on, to plug storage media devices directly to drive 102. Drive 102 may provide suitable buttons for automatically copying the data in the storage media device to the cloud storage 106. For example, the user can directly plug the storage media device to drive 102 and then hit a button on drive 102, which automatically initiates copying of data in the device plugged into the cloud storage 106.

In an operation 312, once the data is transferred to the cloud storage 106, the data storage in the cloud storage 106 is verified. The verification module 208 in drive 102 verifies the data transferred to the cloud storage 106 for storage.

In an operation 314, it is determined whether the storage is successful in the cloud storage 106. Determining whether the storage is successful may be done, for instance, by a suitable handshaking exchange of messages, or other suitable protocol, between drive 102 and the cloud storage 106.

In an operation 316, in response to determining that the storage is successful, drive 102 receives a verification acknowledgement from the cloud storage 106.

In an operation 318, the data storage buffer 204 in drive 102 is cleaned up, to free up the storage space that has been taken up by the data whose cloud storage verification was received. As described elsewhere, this drive cleanup ensures continuous smooth and efficient data movement from the user electronic device 104 to the cloud storage 106. This is due to the fact that after the data is transferred from drive 102 to the cloud storage 106 and the success of the cloud storage is confirmed, the space on drive 102 may be made available for the next batch of data.

In an embodiment, the files' "location state" is tracked by the local file records. The location state can be defined as a state where the files start out on drive 102. Then shortly after being created, the files are also copied to the cloud storage 106, and marked as being both local and remote. After a certain amount of time passes, the files will be replaced locally with a placeholder (a thumbnail or empty placeholder file), and the file record will be marked as only existing remotely.

Data Retrieval from the Cloud

Figure 4:
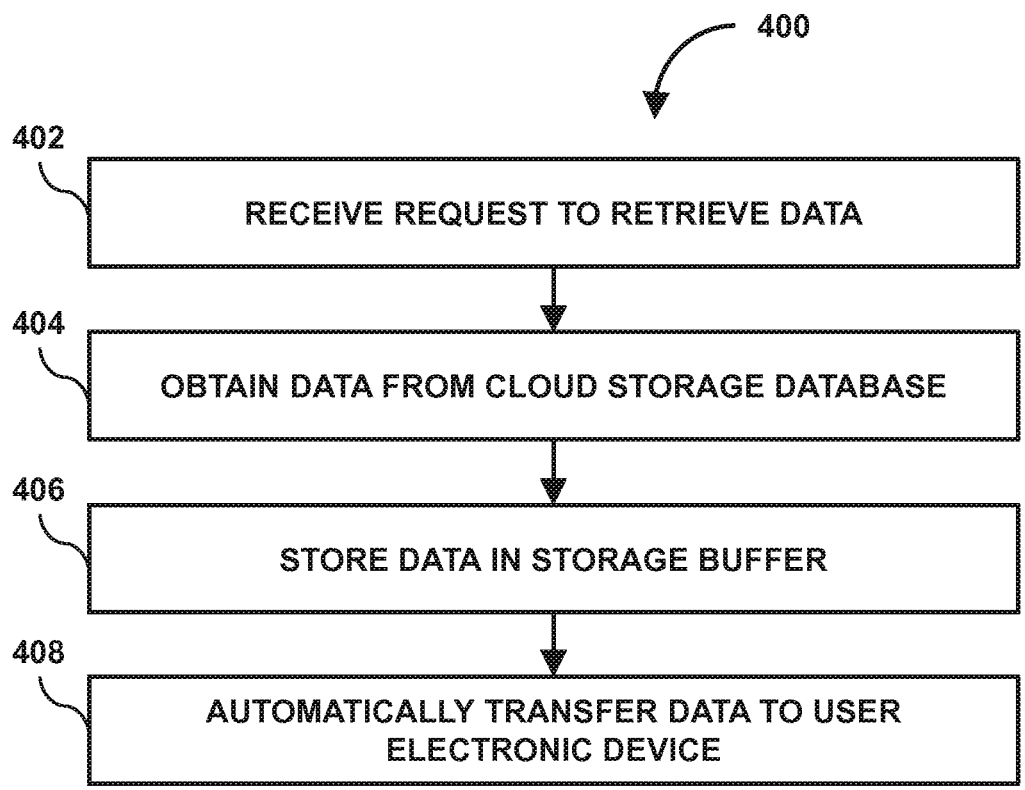
FIG. 4 illustrates a process flow diagram for retrieving data across a cloud based storage system using a drive, according to an implementation of the invention.

FIG. 4 illustrates a process flow diagram 400 for retrieving data across a cloud based storage system using a drive, according to an implementation of the invention.

The data retrieval method 400 begins when the cloud based storage system 100 receives a request from the user electronic device 104 to retrieve a data item. The request can be, for instance, a user command to open a file, print the file, attach the file to an e-mail message, etc.

In an operation 402, the data retrieve request is received from the user. The method 400 allows the interface module 202 to receive the data retrieve request.

In response to receiving the retrieve request, in an operation 404, the data is copied from the cloud storage 106 to drive 102. The method 400 allows the data management module 206 to copy the data from the cloud storage 106 based on the request provided by the user.

In an operation 406, the retrieved data is temporarily stored in the data storage buffer 204 of drive 102. As the data resides on drive 102, the data is associated with the ghost image, etc., which has been present on drive 102 so as to be visible to the user through the user electronic device 104. Accordingly, that which was only represented by the ghost file is now supplanted by the file itself. To the user, this appears transparent, as long as data throughput between the cloud storage 106 and drive 102 does not provide a noticeable delay.

In an operation 408, the data is automatically transferred from drive 102 to the user electronic device 104. Again, the data is made available to the user electronic device 104, as though it had been residing all along on drive 102. The only potential limiting factor is the data throughput capacity between the cloud storage 106 and drive 102.

In an embodiment, users can use the web interface module 202 to restore a file. When a restore is initiated from the web interface module 202, drive 102 is notified of the restore and copies the data or file from the cloud storage 106 back to drive 102, replacing the local placeholder (i.e., the ghost file). The various actions in method 400 may be performed in the order presented, in a different order or simultaneously. Further, in some implementations, some actions listed in FIG. 4 may be omitted.

Storing Data at Drive 102 and/or on the Cloud

Figure 5:
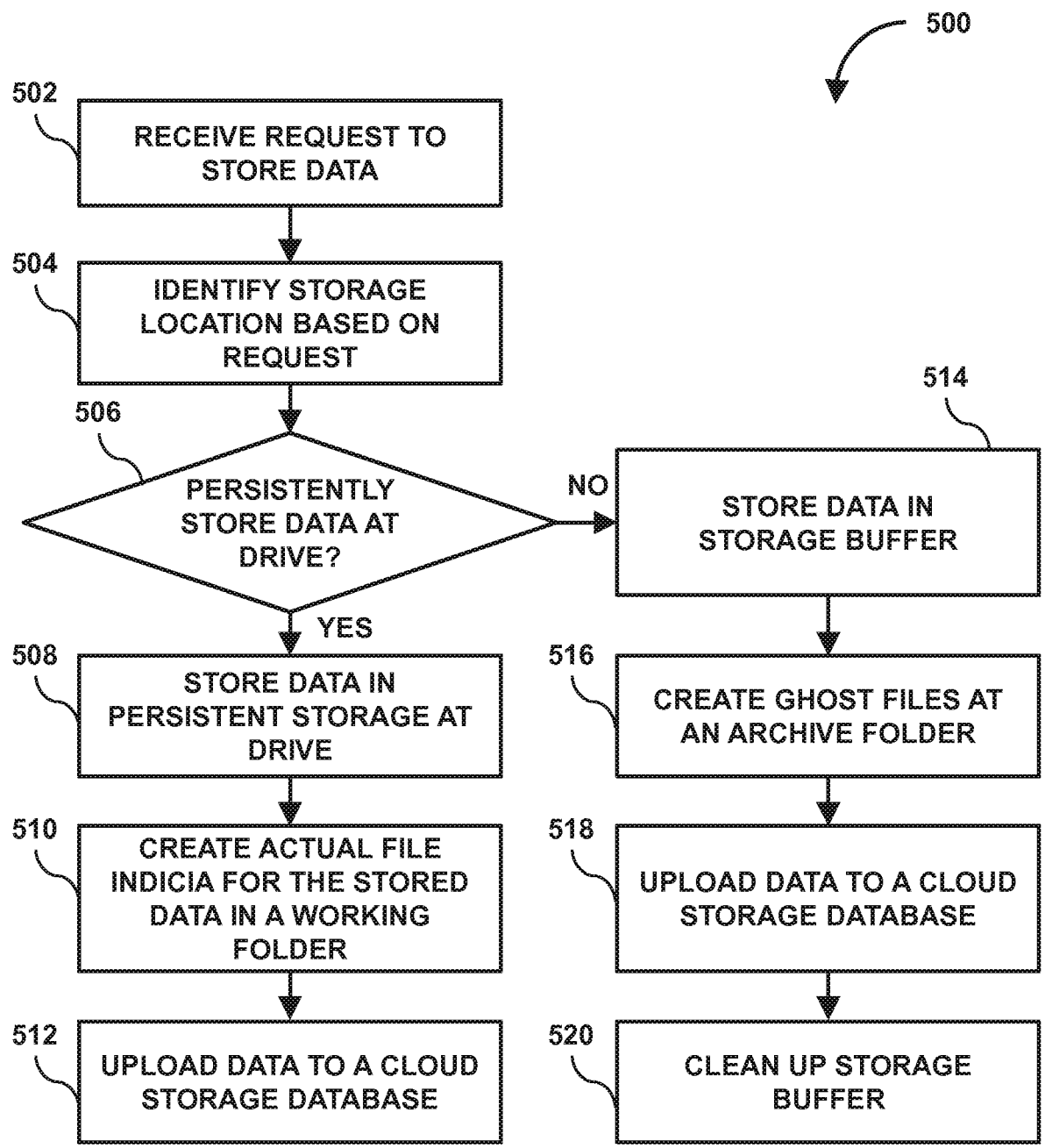
FIG. 5 illustrates a process flow diagram for storing data persistently at a local storage drive and/or storage, according to an implementation of the invention.

FIG. 5 illustrates a process flow diagram 500 for storing data persistently at a local storage drive and/or using cloud storage, according to an implementation of the invention.

In an operation 502, drive 102 may receive a request to store data. For instance, a user may drag-and-drop a file or other data into a folder associated with drive 102.

In an operation 504, drive 102 may identify a storage location based on the request. For instance, a first folder on drive 102 may correspond to a "working" folder that is associated with persistent storage on device. A second folder on drive 102 may correspond to an "archive" folder that is associated with cloud storage. In the foregoing example, drive 102 may identify a corresponding storage location at which the data should be stored based on the folder to which the data was dragged (or otherwise selected).

In an operation 506, drive 102 may determine whether the data should be persistently stored at drive 102. Such determination may be made based on the request (e.g., based on an identity of a folder to which the data was dragged).

In an operation 508, responsive to a determination that the data should be stored persistently at drive 102, the drive may store the data locally in a persistent storage.

In an operation 510, drive 102 may create actual file indicator(s) for the stored data in a working folder (e.g., a folder that is associated with locally and persistently stored data). An actual file indicator represents a file stored locally and therefore is different from a ghost file described herein.

In an operation 512, drive 102 may also upload the data to cloud storage (although in other implementations, the data is stored only locally at drive 102).

Returning to operation 506, responsive to a determination that the data should not be stored persistently at drive 102, the drive may store the data in a storage buffer in an operation 514.

In an operation 516, drive 102 may create ghost file(s) corresponding to the buffered data in an appropriate folder (e.g., an archive folder) of the drive. In an operation 518, drive 102 may upload data to cloud storage. In an operation 520, drive 102 may clean up the storage buffer (e.g., by removing the buffered data). Such clean up may be contingent upon receiving, from the from cloud storage, an acknowledgement that the data was successfully uploaded to cloud storage.

Limited-Time Recovery of Deleted Data

Figure 6:
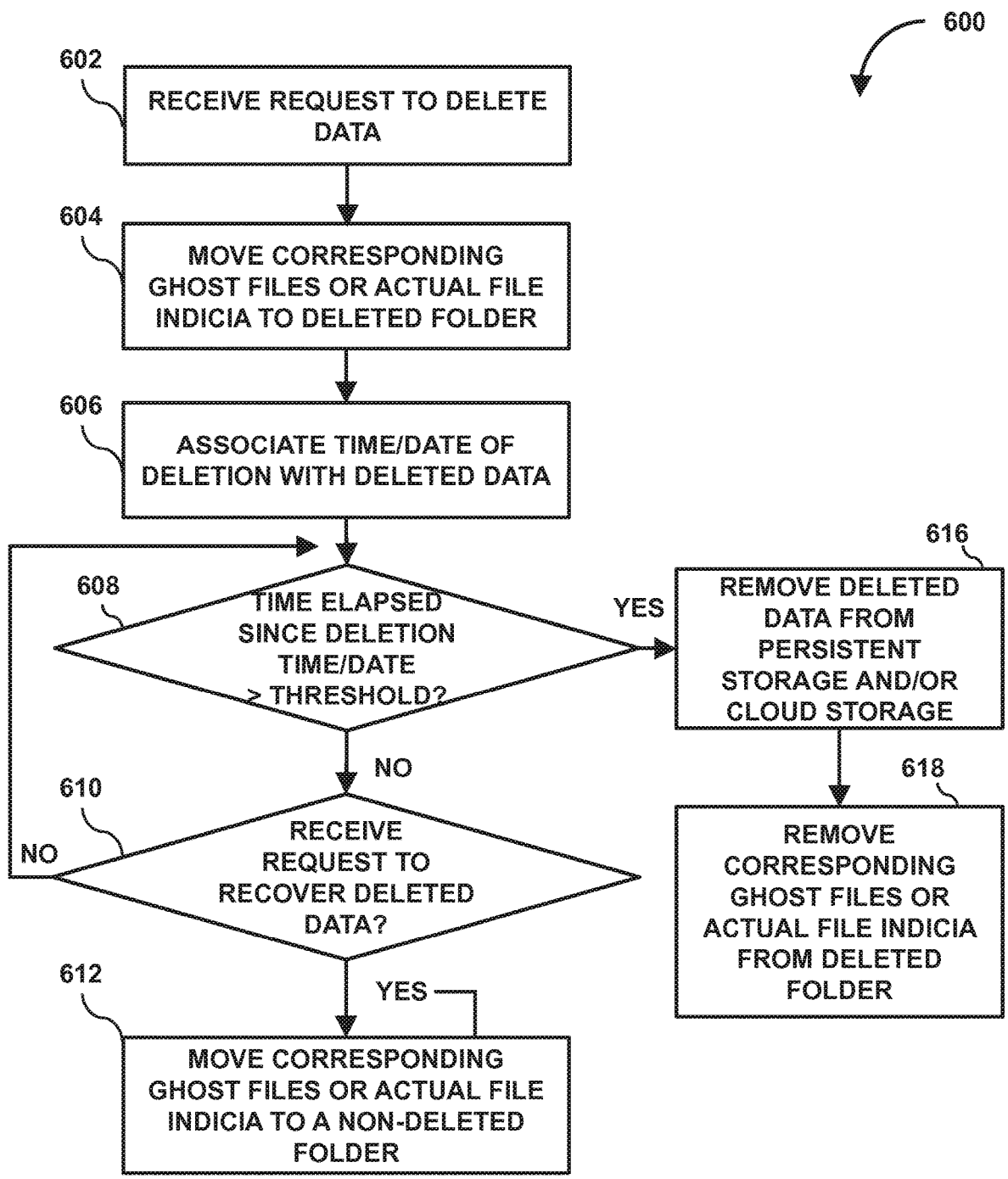
FIG. 6 illustrates a process flow diagram for providing deleted data that is recoverable within a threshold time, according to an implementation of the invention.

FIG. 6 illustrates a process flow diagram 600 for providing deleted data that is recoverable within a threshold time, according to an implementation of the invention.

In an operation 602, drive 102 may receive a request to delete data. The data to be deleted may be stored locally at drive 102 and/or at cloud storage 106.

In an operation 604, corresponding ghost file(s) or actual file indicator(s) may be moved to a location on drive 102 corresponding to data to be deleted (e.g., a "deleted" folder). For example, drive 102 may move a ghost file corresponding to a file stored at cloud storage 106 to the deleted folder and move an actual file indicator corresponding to a file stored locally at drive 102 to the deleted folder. In this manner, the file to be deleted is removed from its original location and added to another location to give an appearance that the file has been deleted.

In an operation 606, drive 102 may associate deletion time information with the data to be deleted. The deletion time information may include, without limitation, a date/time that a request to delete the data was received, a threshold amount of time before the data to be deleted should actually be deleted, and/or other information relating to the request to delete the data. The deletion time information may be stored locally at drive 102 and/or be maintained by a remote computer (e.g., by computer system 108, in which case drive 102 may cause the deletion time information to be transmitted to computer system 108).

In an operation 608, drive 102 may determine whether an elapsed time since the request to delete the data was received meets or exceeds a threshold amount of time. For example, once a request to delete a file is made, the file may be retained for up to the threshold amount of time (e.g., 30 days) before actually being deleted. In this manner, the deleted file may be recovered until the threshold amount of time has elapsed since the file was requested to be deleted.

In an operation 610, responsive to a determination that the threshold amount of time has not been exceeded, drive 102 may determine whether a request to recover the data to be deleted has been received. If not, processing may return to operation 608. If a request to recover the data to be deleted has been received, drive 102 may move the appropriate ghost file or actual file indicator from the deleted folder back to the original location, providing an appearance that the deleted file has been recovered.

Returning to operation 608, responsive to a determination that the elapsed time has exceeded the threshold amount of time, the data to be deleted may be actually removed from the drive 102 and/or storage 106 (wherever it is stored) in an operation 610. In an operation 612, drive 102 may delete the corresponding ghost file(s) or actual file indicator(s) from the deleted folder as well.

Although process 600 has been described in terms of deleting data only when the threshold amount of time has been exceeded, drive 102 may archive the data to be deleted (either in drive 102 or at cloud storage 106), delete the data immediately after the request to do so is received, and then recover (if necessary and requested within the threshold amount of time) the data as necessary from the archive location.

Folders Corresponding to Different Cloud Storage Services

Figure 7:
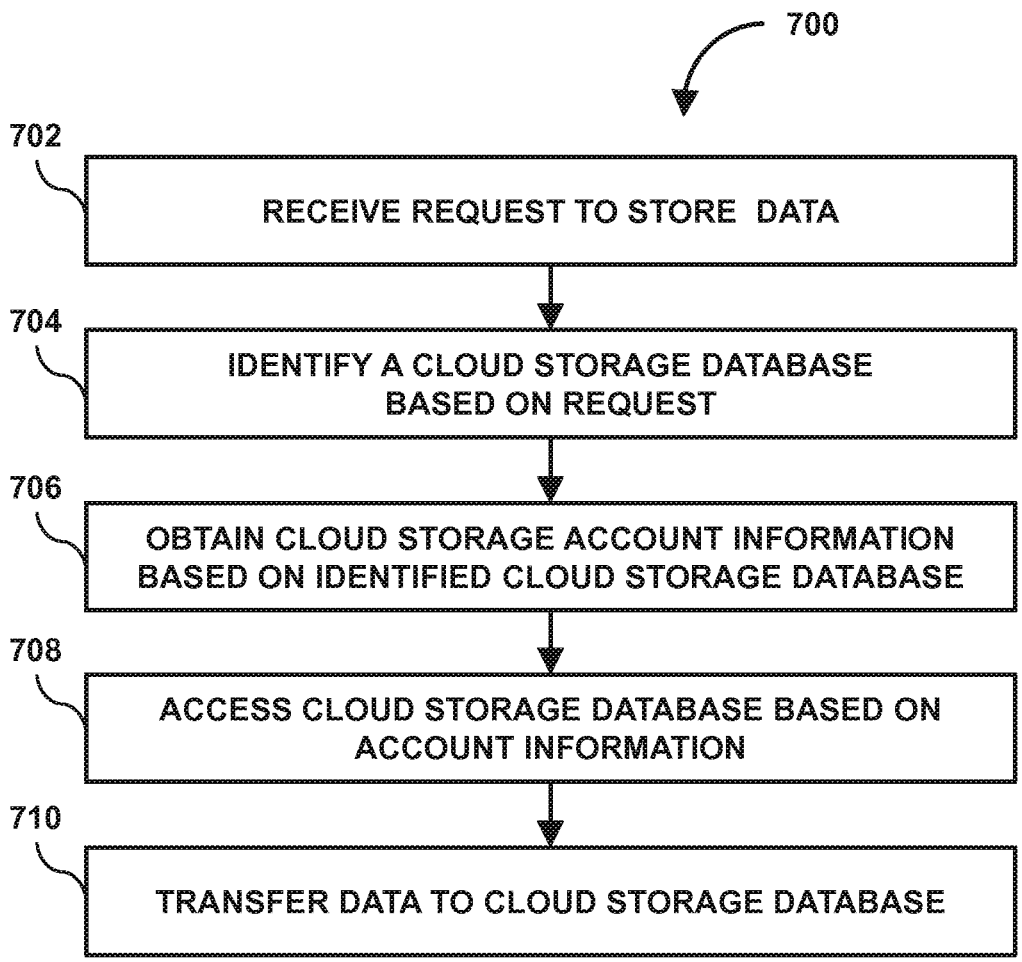
FIG. 7 illustrates a process flow diagram for storing data at different cloud storage services, according to an implementation of the invention.

FIG. 7 illustrates a process flow diagram 700 for storing data at different cloud storage services, according to an implementation of the invention.

In an operation 702, drive 102 may receive a request to store data. The request may be in the form of a drag-and-drop request described herein (or any other type of request).

In an operation 704, drive 102 may identify a cloud storage service based on the request. For instance, a first folder at drive 102 may correspond to cloud storage provided by a first cloud storage service (e.g., Amazon S3). A second folder at drive 102 may correspond to cloud storage provided by a second cloud storage service (e.g., Google Drive). Other folders may correspond to other cloud storage provided by other cloud storage services.

In an operation 706, drive 102 may obtain cloud storage account information related to the identified cloud storage service. For instance, drive 102 may obtain pre-stored account credential information from local storage at drive 102 and/or from a remote device (e.g., computer system 108).

In an operation 708, drive 102 may access the appropriate cloud storage based on the cloud storage account information.

In an operation 710, drive 102 may transfer data to the cloud storage. Although process 700 is described with respect to uploading data to cloud storage, the reverse may occur when downloading data from cloud storage. For instance, drive 102 may receive a request to access data stored at cloud storage. Drive 102 may identify an appropriate cloud storage service from which to retrieve the data based on an identity of a folder at which a ghost file corresponding to the data is stored and download the data from the identified cloud storage service.

User Interface Illustrations

Figure 8A:
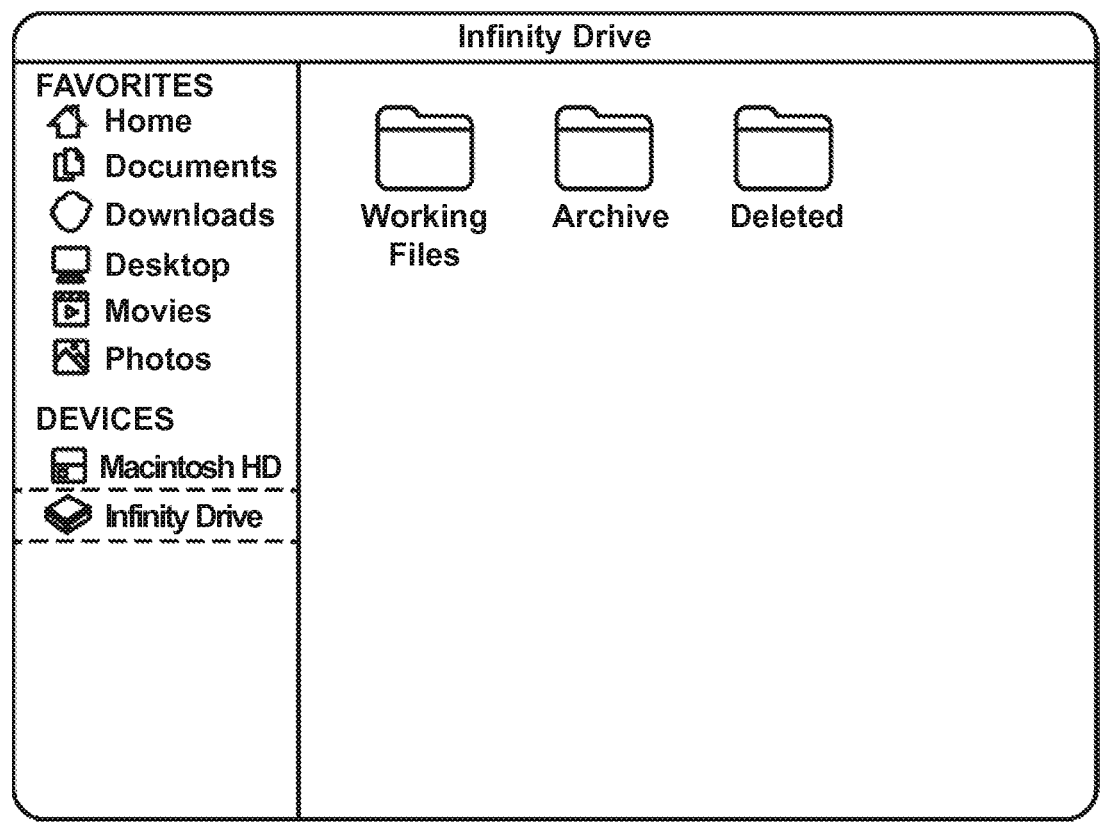
FIG. 8A illustrates an exemplary graphical user interface screen shot of a finder window displayed at a user electronic device, according to an implementation of the invention.

FIG. 8A depicts an exemplary screen shot which, for illustrative purpose without limitation, shows an implementation according to Apple Macintosh technology. The screen shot of FIG. 8A illustrates a finder window of the user electronic device 104, according to the implementations as disclosed herein. As depicted, the finder window of the user electronic device 104 allows the user to access drive 102, designated as Infinity Drive, from among a menu of data storage resources that are available, the other illustrated data resource being the Macintosh hard drive. Several file folder icons with descriptive names, are illustrated as contents of the Infinity Drive. The ghost files represent memory storage for containing data chunks which are actually stored remotely in the cloud storage 106.

Figure 8B:
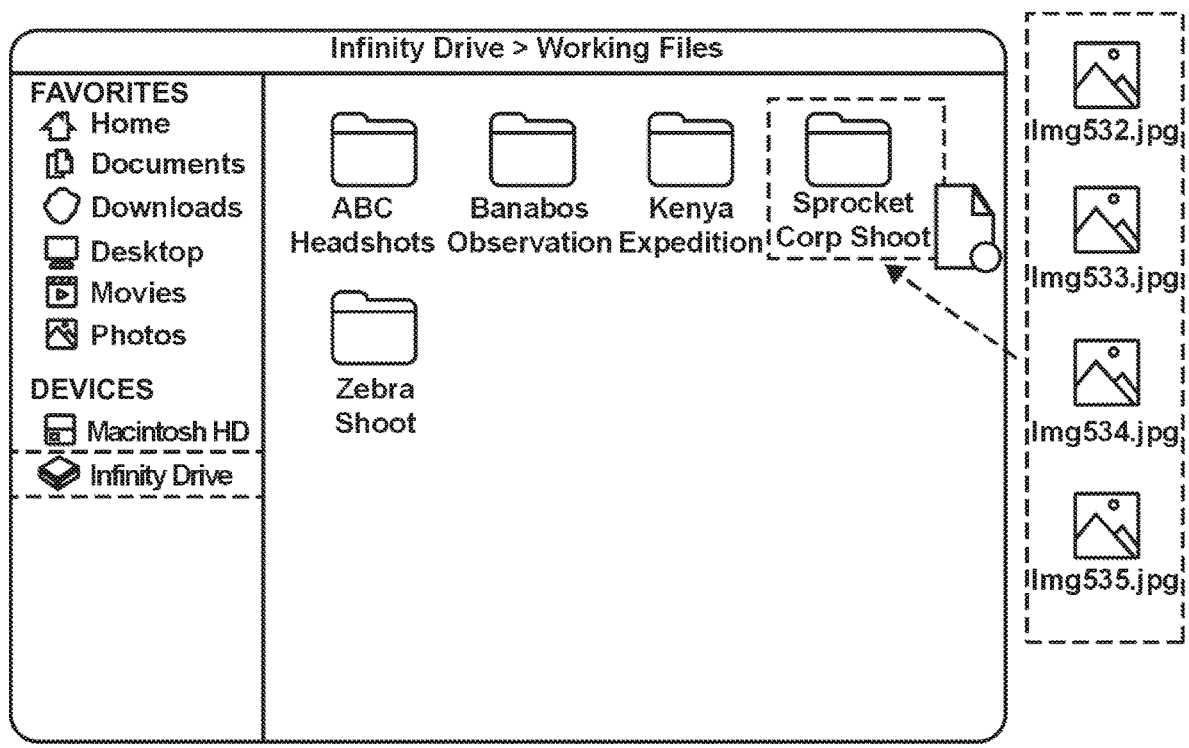
FIG. 8B depicts an exemplary graphical user interface screen shot illustrating uploading user files into cloud storage through the local storage drive, according to an implementation of the invention.

FIG. 8B depicts an exemplary screen shot illustrating uploading user files into the cloud storage 106 by copying them to the drive 102, according to the implementations as disclosed herein. The user files, here shown as four .jpg files, reside in the user electronic device 104. The user employs drag-and-drop functionality that is supported by the operating system of the user electronic device 104, to move the .jpg files into the data folder represented by the ghost file in the "infinity drive." As depicted, the user can easily upload the files or data into the cloud storage 106 by simply dragging and dropping the files into the drive folders through the finder window. Once the user completes this user interface activity, the automatic uploading from drive 102 to the cloud storage 106 takes over. As shown, a list of .jpg images are selected collectively, and are dragged (for instance by suitable mouse clicking) into the Infinity Drive menu window, to be dropped onto the "Zebra shoot" folder.

Figure 8C:
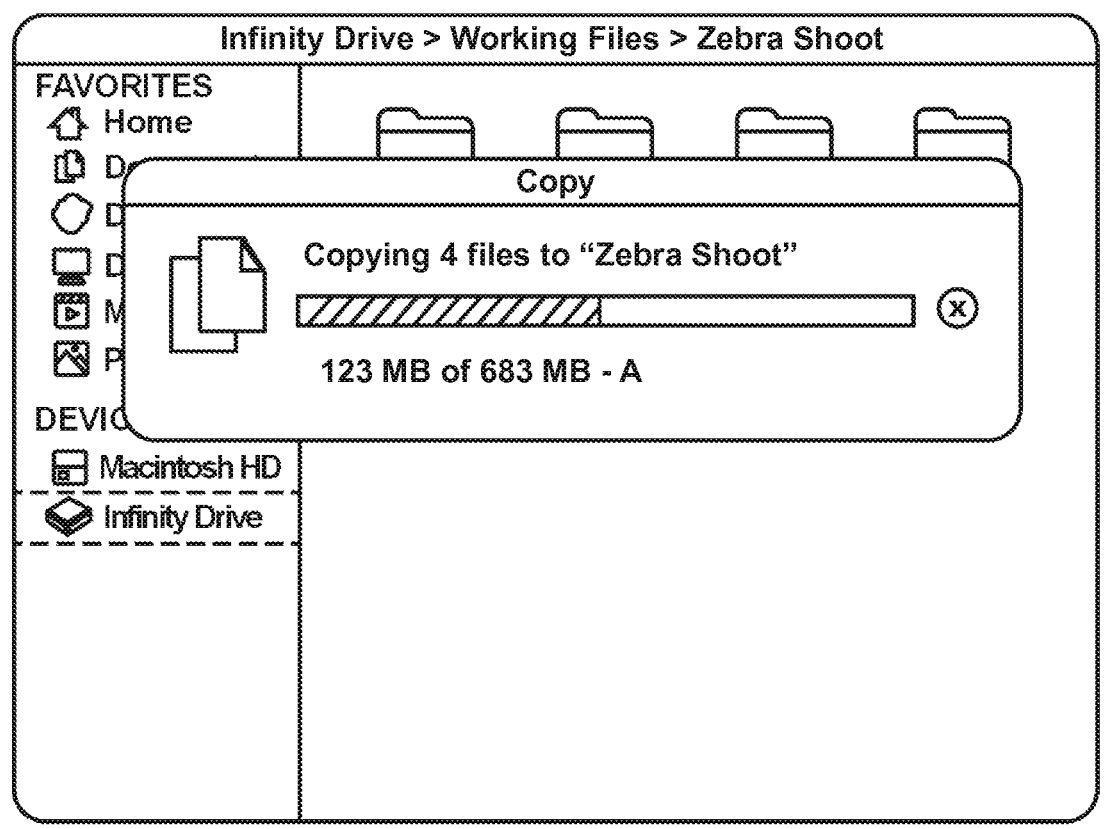
FIG. 8C depicts an exemplary graphical user interface screen shot illustrating copying user files into the local storage drive from cloud storage, according to an implementation of the invention.

FIG. 8C depicts an exemplary screen shot illustrating a graphical representation of the process of copying user files into drive 102 across the cloud storage 106, according to the implementations as disclosed herein. FIG. 8c illustrates a temporary, intermediate user interface progress bar histogram message showing that the .jpg files are in the process of being transferred. This, or other suitable user interface indicia, may be used in order to communicate to the user that the data transfer is in progress.

Figure 8D:
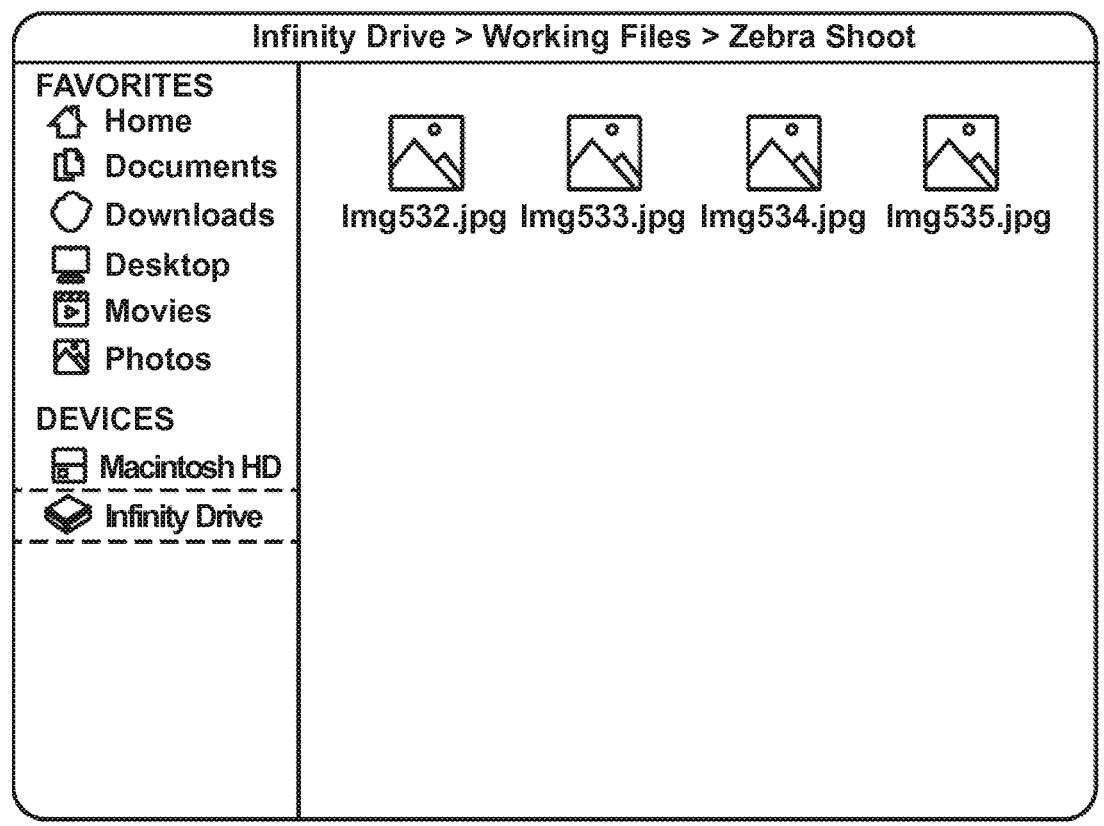
FIG. 8D depicts an exemplary graphical user interface screen shot displaying copied user files in the drive, according to an implementation of the invention.

FIG. 8D depicts an exemplary screen shot displaying copied user files in drive 102, according to the implementations as disclosed herein. For instance, after the data transfer shown in FIG. 8C is complete, the .jpg files continue to reside within the Zebra shoot folder. Then, in conventional manner, the user can select the Zebra shoot folder, for instance by clicking on it, and can open it up to see the contents, which are the transferred .jpg files.

Figure 9A:
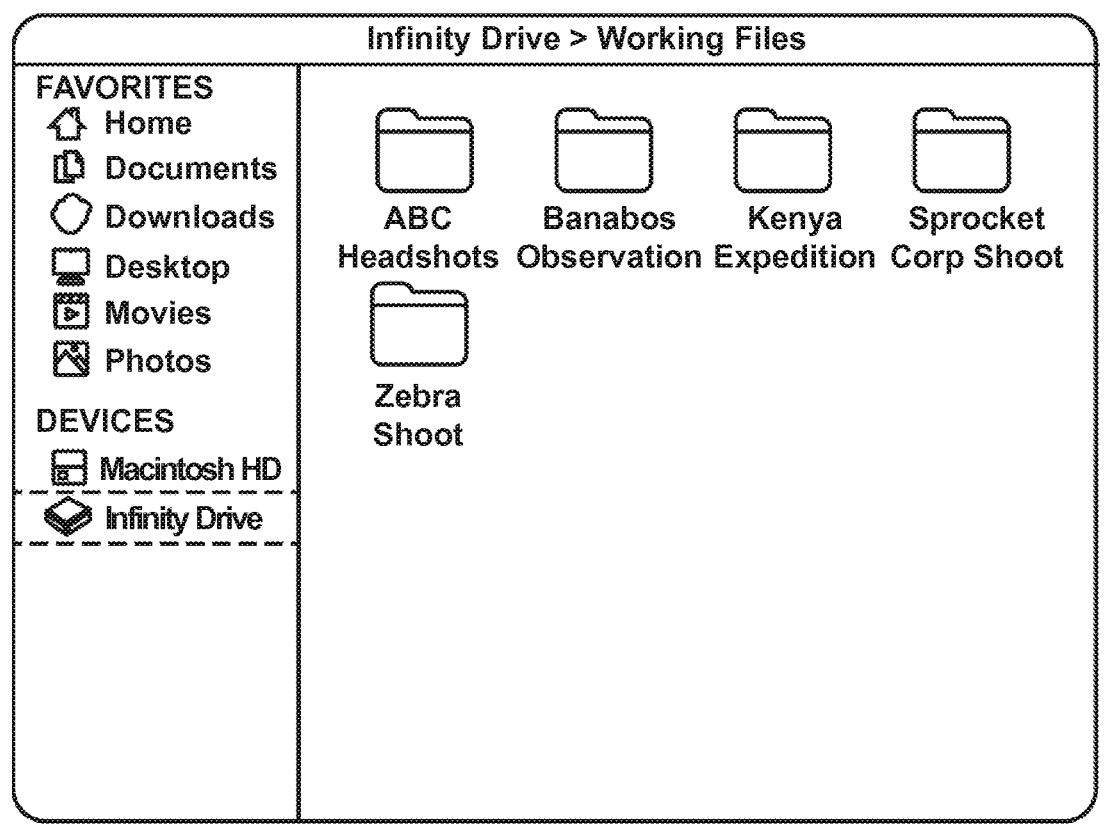
FIG. 9A depicts an exemplary graphical user interface screen shot of a working folder that represents data stored persistently at the local storage drive, according to an implementation of the invention.

FIG. 9A depicts an exemplary graphical user interface screen shot of a working folder that represents data stored persistently at drive 102, according to an implementation of the invention. Other folders corresponding to persistent storage at drive 102 may be used as well. As illustrated, a "Working Folder" may be associated with files that are stored locally at drive 102. Therefore, the Working Folder may be associated an actual file indicator for each file stored locally.

In some instances, the files in the Working Folder may be stored using cloud storage 106 as well. In some of these instances, the files in the Working Folder may be synchronized with files at cloud storage 106 such that any changes made to files in the Working Folder may be synchronized with their counterparts at cloud storage 106. Likewise, any files changed at cloud storage 106 (e.g., if the user updates a file at cloud storage 106 other than through drive 102) may be synchronized with their counterparts at drive 102.

Figure 9B:
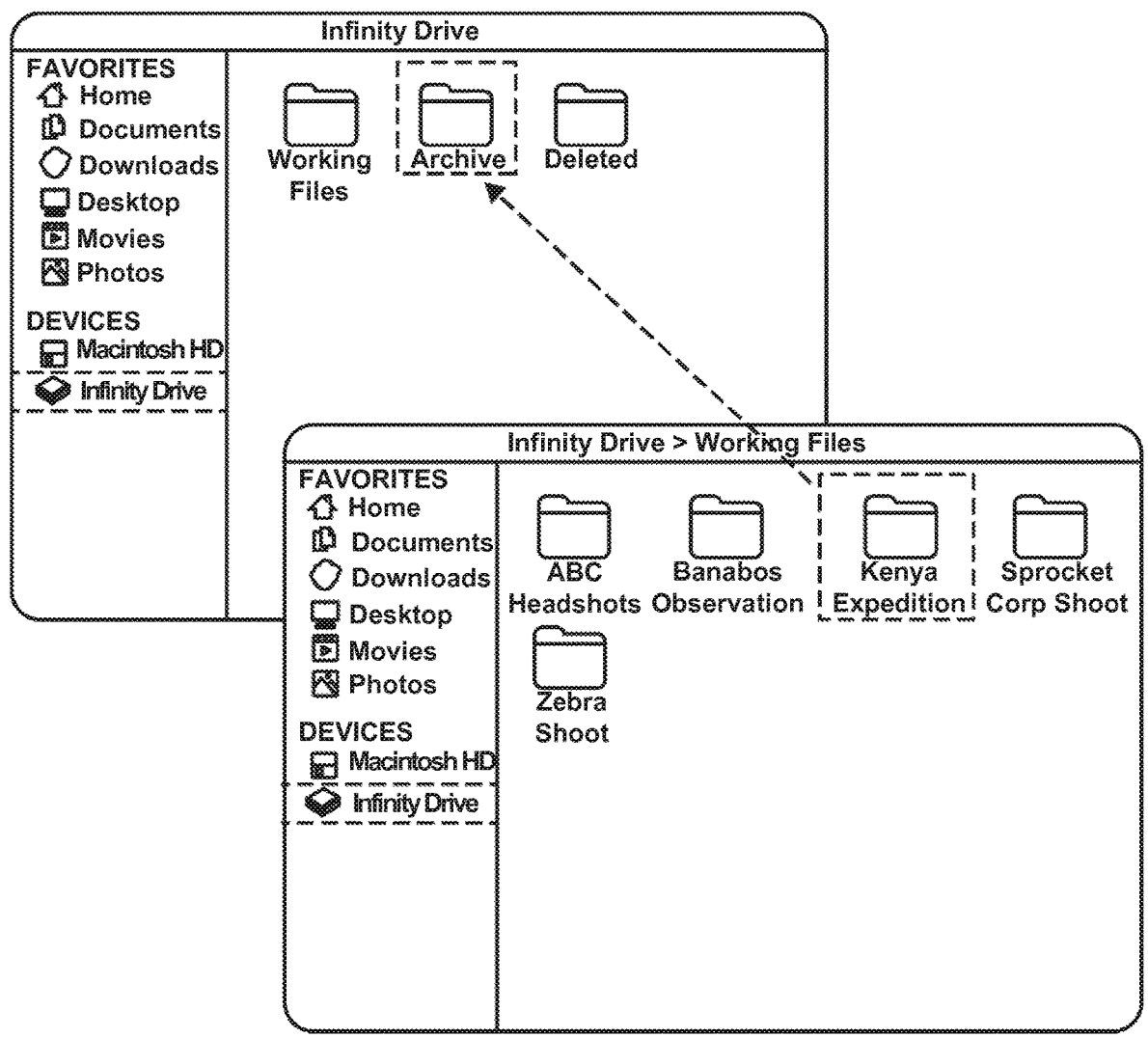
FIG. 9B depicts an exemplary graphical user interface screen shots illustrating how files of a working folder that represents data stored persistently at the local storage drive can be moved to an archive folder that represents data stored using cloud storage, according to an implementation of the invention.

FIG. 9B depicts an exemplary graphical user interface screen shots illustrating how files of a working folder that represents data stored persistently at local storage drive 102 can be moved to an archive folder that represents data stored using cloud storage 106, according to an implementation of the invention. Other folders corresponding to files stored at cloud storage 106 may be used as well. As an example, folder icons or labels (e.g., "Canyons" folder, "Kenya Expedition" folder, "Great Lakes folder," etc.) shown within an "Archive" folder (or individual files therein), can be dragged by a user and dropped into a "Working Files" folder to move the corresponding folders and/or individual files therein from the Working Files folder to the Archive folder. This "drag and drop" move interaction may, for instance, automatically cause the file to be uploaded to cloud storage 106 and removed from local storage drive 102 (e.g., responsive to receiving a confirmation that the file was successfully uploaded to cloud storage 106 from a cloud storage service system hosting cloud storage 106). In this instance, local storage drive 102 may automatically create a ghost file representation of the file in the archive folder (e.g., responsive to receiving a confirmation that the file was successfully uploaded to cloud storage 106 from a cloud storage service system hosting cloud storage 106).

Figure 9C:
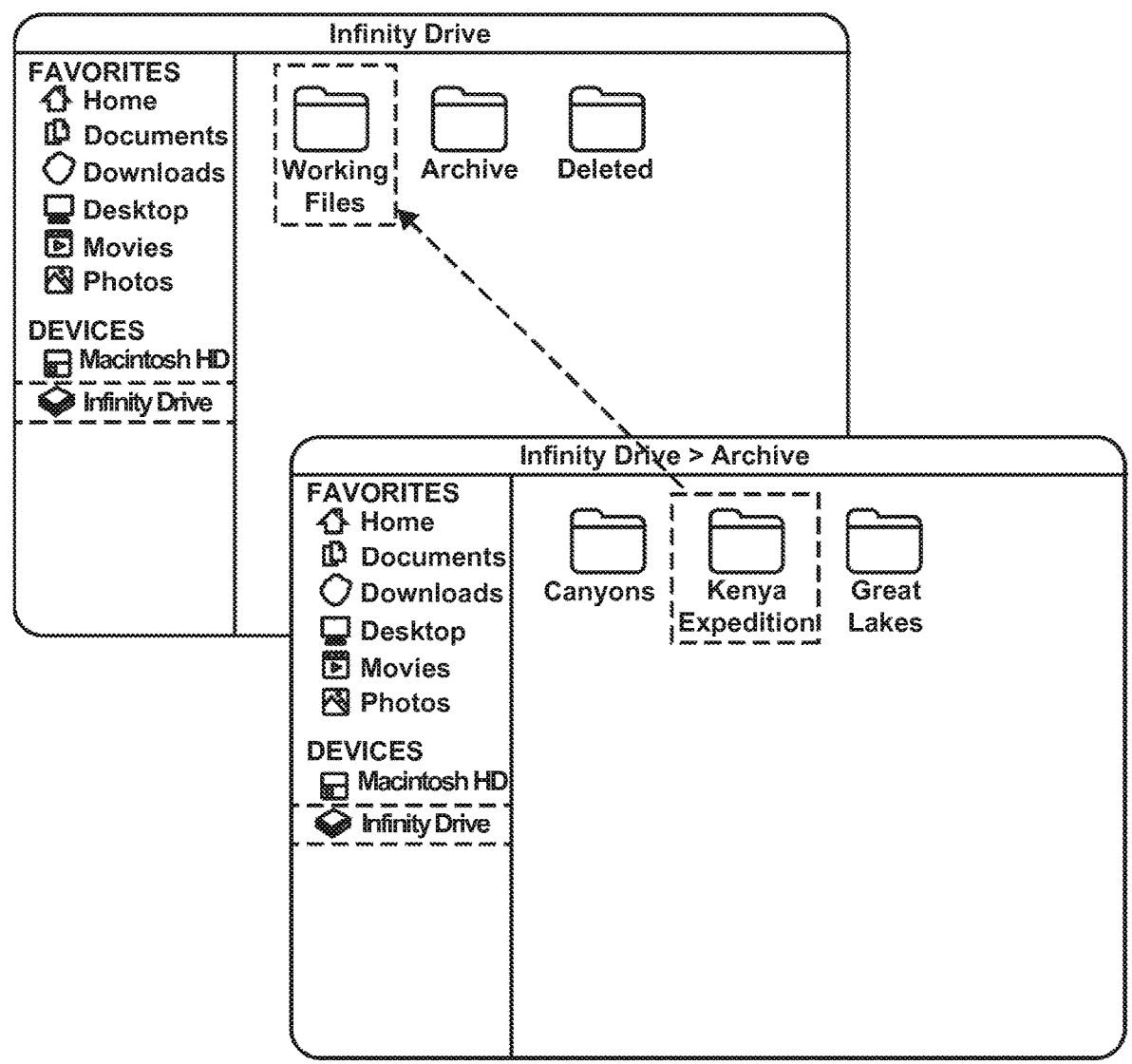
FIG. 9C depicts an exemplary graphical user interface screen shots illustrating how files of an archive folder that represents data stored using cloud storage can be moved to a working folder that represents data stored persistently at the local storage drive, according to an implementation of the invention.

FIG. 9C depicts an exemplary graphical user interface screen shots illustrating how files of an archive folder that represents data stored using cloud storage 106 can be moved to a working folder that represents data stored persistently at local storage drive 102, according to an implementation of the invention. As an example, folder icons or labels (e.g., "Canyons" folder, "Kenya Expedition" folder, "Great Lakes folder," etc.) shown within a "Working Files" folder (or individual files therein), can be dragged by a user and dropped into an "Archive" folder to move the corresponding folders and/or individual files therein from the Archive folder to the Working Files folder. This "drag and drop" move interaction may, for instance, automatically cause the file to be downloaded from cloud storage 106 to the Working Files folder.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Accordingly, the disclosure of the present invention is intended to be illustrative, but not limiting, of the scope of the invention, which is set forth in the following claims.

What is claimed is:

1. One or more non-transitory machine-readable media storing instructions that, when executed by one or more processors of a computer system, cause the computer system to perform operations comprising:
    obtaining, from a data source, data to be stored;
    obtaining storage information that indicates that the obtained data should be stored using (i) both the local persistent storage and the cloud storage, (ii) the cloud storage but not the local persistent storage, or (iii) the local persistent storage but not the cloud storage; and
    causing, based on the storage information, the obtained data to be stored using the local persistent storage, the cloud storage, or both the local persistent storage and the cloud storage such that (i) the obtained data is stored in association with a first file folder responsive to storage of the obtained data using both the local persistent storage and the cloud storage, (ii) the obtained data is stored in association with a second file folder responsive to storage of the obtained data using the cloud storage but not the local persistent storage, and (iii) the obtained data is stored in association with a third file folder responsive to storage of the obtained data using the local persistent storage but not the cloud storage;
    responsive to obtaining the data from the data source, cause the obtained data stored in association with the first file folder and/or the second file folder to be stored in cloud storage;
    determining whether an acknowledgement indicating that the obtained data has been successfully stored in the cloud storage is received from the cloud storage;
    responsive to the determination that the acknowledgement is received, causing the obtained data to be removed from local persistent storage of the computer system; and
    responsive to obtaining the data from the data source, causing a ghost file representation of the obtained data to be stored in the local persistent storage in lieu of storing the obtained data in the local persistent storage, wherein the ghost file representation is a local file representative of the obtained data and is smaller in size than a file comprising the obtained data and stored in the cloud storage.

2. The one or more non-transitory machine-readable media of claim 1, wherein the storage of the ghost file representation in the local persistent storage is further responsive to a determination that the acknowledgement is received.

3. The one or more non-transitory machine-readable media of claim 2, wherein the storage of the ghost file representation and the removal of the obtained data from the local persistent storage are based on a default measure programmed into the computer system that automatically causes storage of one or more corresponding ghost file representations and removal of cloud-uploaded data to which the one or more ghost file representations correspond upon receipt of acknowledgement indicating that the cloud-uploaded data has successfully been uploaded to the cloud storage.

4. A system comprising:
    a computer system comprising local persistent storage and one or more processors programmed to execute one or more computer program instructions that, when executed, cause the computer system to:
        obtain, from a data source, data to be stored;
        obtain storage information that indicates that the obtained data should be stored using (i) both the local persistent storage and the cloud storage, (ii) the cloud storage but not the local persistent storage, or (iii) the local persistent storage but not the cloud storage; and
        cause, based on the storage information, the obtained data to be stored using the local persistent storage, the cloud storage, or both the local persistent storage and the cloud storage such that (i) the obtained data is stored in association with a first file folder responsive to storage of the obtained data using both the local persistent storage and the cloud storage, (ii) the obtained data is stored in association with a second file folder responsive to storage of the obtained data using the cloud storage but not the local persistent storage, and (iii) the obtained data is stored in association with a third file folder responsive to storage of the obtained data using the local persistent storage but not the cloud storage;
        responsive to obtaining the data from the data source, cause the obtained data stored in association with the first file folder and/or the second file folder to be stored in cloud storage;
        determine whether an acknowledgement indicating that the obtained data has been successfully stored in the cloud storage is received from the cloud storage;
        responsive to the determination that the acknowledgement is received, cause the obtained data to be removed from the local persistent storage; and
        responsive to obtaining the data from the data source, cause a ghost file representation of the obtained data to be stored in the local persistent storage in lieu of storing the obtained data in the local persistent storage, wherein the ghost file representation is a local file representative of the obtained data and is smaller in size than a file comprising the obtained data and stored in the cloud storage.

* * * * *